United States Patent
Fischer et al.

(10) Patent No.: US 8,840,141 B1
(45) Date of Patent: Sep. 23, 2014

(54) AIR BAG DEPLOYMENT RESTRICTOR

(71) Applicant: TRW Vehicle Safety Systems Inc., Washington, MI (US)

(72) Inventors: Kurt F. Fischer, Leonard, MI (US); Douglas M. Gould, Lake Orion, MI (US); Robert W. Balsis, Imlay City, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 13/834,822

(22) Filed: Mar. 15, 2013

(51) Int. Cl.
*B60R 21/2346* (2011.01)
*B60R 21/205* (2011.01)
*B60R 21/2338* (2011.01)

(52) U.S. Cl.
CPC ... *B60R 21/2346* (2013.01); *B60R 2021/23388* (2013.01); *B60R 21/205* (2013.01); *B60R 2021/23386* (2013.01)
USPC ...................... 280/743.2; 280/732; 280/743.1

(58) Field of Classification Search
CPC ............. B60R 21/205; B60R 21/2346; B60R 21/2334; B60R 21/2338; B60R 21/2342; B60R 2021/23386; B60R 2021/23388; B60R 2021/161
USPC .................................... 280/732, 743.2, 743.1
See application file for complete search history.

(56) References Cited

U.S. PATENT DOCUMENTS

| | | | |
|---|---|---|---|
| 5,306,042 A | 4/1994 | Frank | |
| 5,308,111 A | 5/1994 | Sommer | |
| 5,348,343 A * | 9/1994 | Hawthorn | 280/730.1 |
| 5,609,363 A | 3/1997 | Finelli | |
| 5,746,447 A * | 5/1998 | Dyer et al. | 280/743.2 |
| 6,082,760 A | 7/2000 | Ukai et al. | |
| 7,021,653 B2 * | 4/2006 | Burdock et al. | 280/730.1 |
| 7,032,923 B2 * | 4/2006 | Kurata et al. | 280/732 |
| 7,195,281 B2 * | 3/2007 | Williams et al. | 280/743.2 |
| 8,544,881 B2 * | 10/2013 | Abele et al. | 280/732 |
| 2008/0007032 A1 * | 1/2008 | Sadek et al. | 280/728.3 |
| 2012/0267881 A1 | 10/2012 | Abele et al. | |

FOREIGN PATENT DOCUMENTS

DE 102012019581 A1 * 4/2013

\* cited by examiner

*Primary Examiner* — Drew Brown
(74) *Attorney, Agent, or Firm* — Tarolli, Sundheim, Covell & Tummino LLP

(57) ABSTRACT

An apparatus (10) for helping to protect an occupant of a vehicle that has an instrument panel and a windshield includes an air bag (14) packaged in an air bag module (30). The air bag (14) is inflatable to a deployed position between the instrument panel and a vehicle occupant. A deployment restrictor (100) is secured to the air bag module (30). The deployment restrictor (100) includes a deflector panel (102) secured to the air bag module (30) and having a portion that is positioned between the packaged air bag (14) and the windshield. The deflector panel (102) at least partially covers the packaged air bag (14) so that the deflector panel moves with the deploying air bag toward the windshield. The connection of the deflector panel (102) to the air bag module (30) limits movement of the deflector panel toward the windshield and thereby redirects the air bag to deploy away from where it would otherwise impact the windshield.

25 Claims, 15 Drawing Sheets

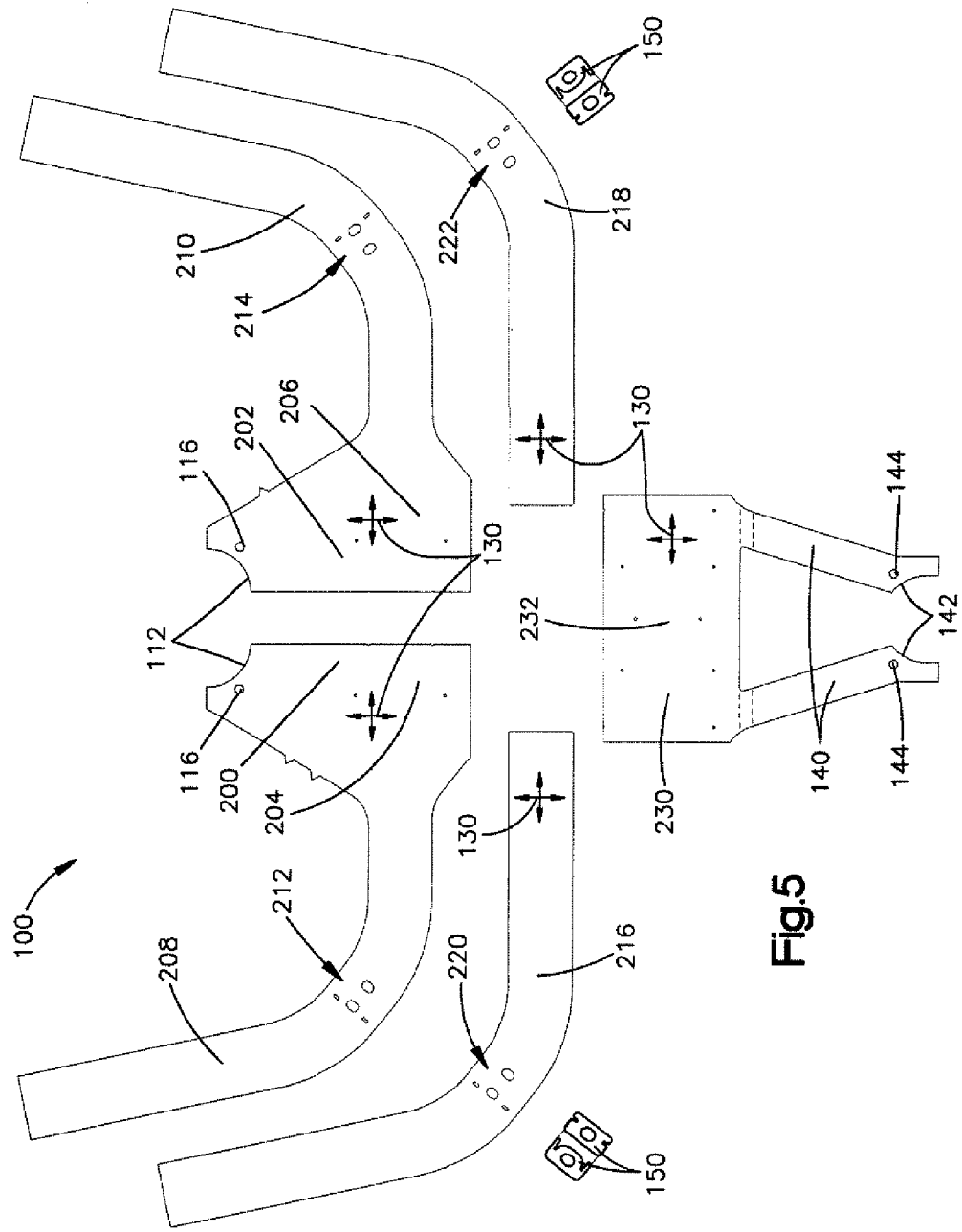

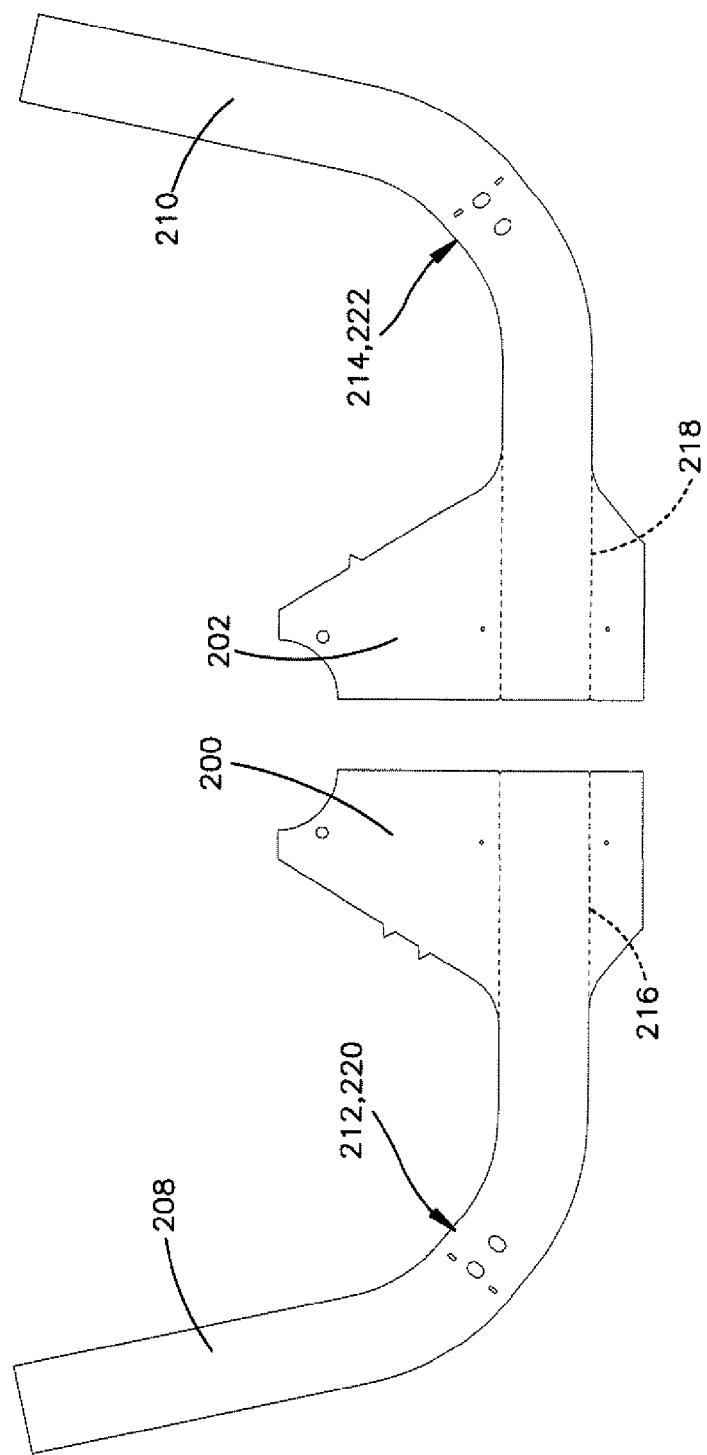

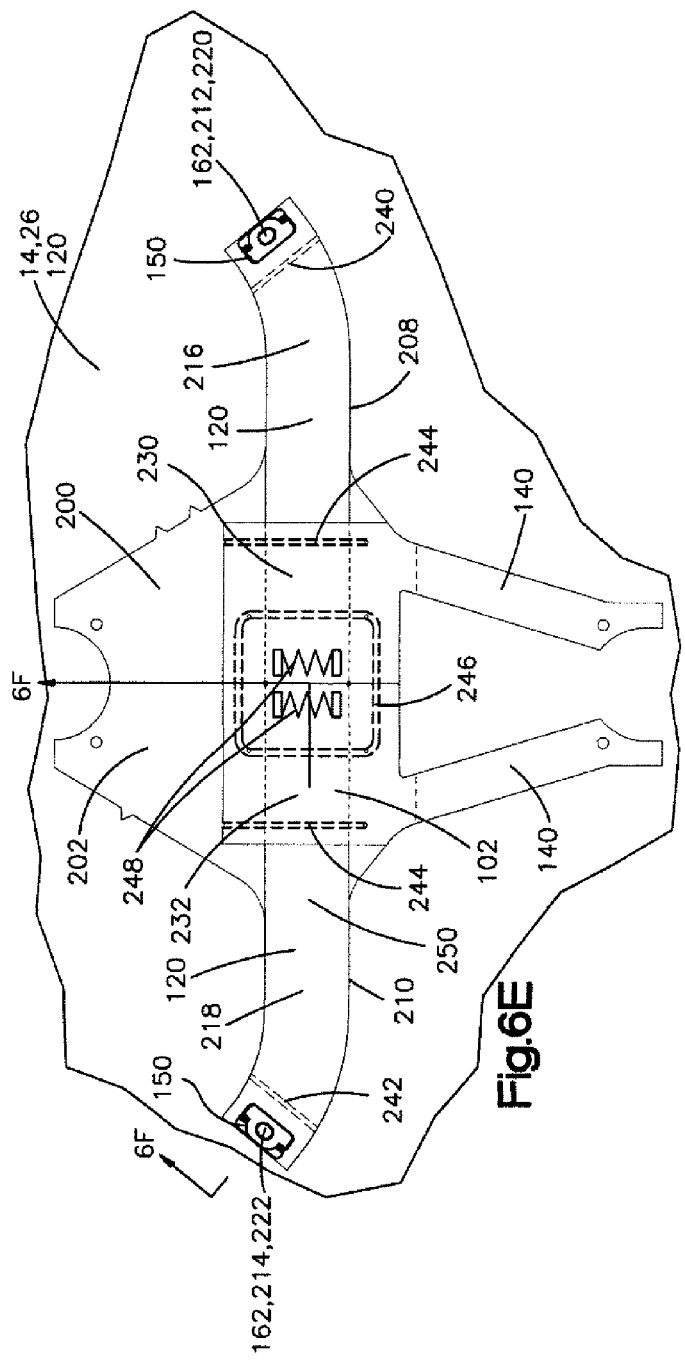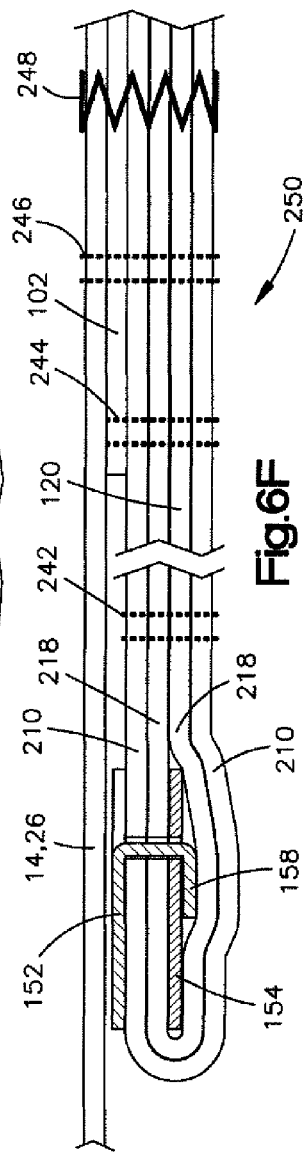

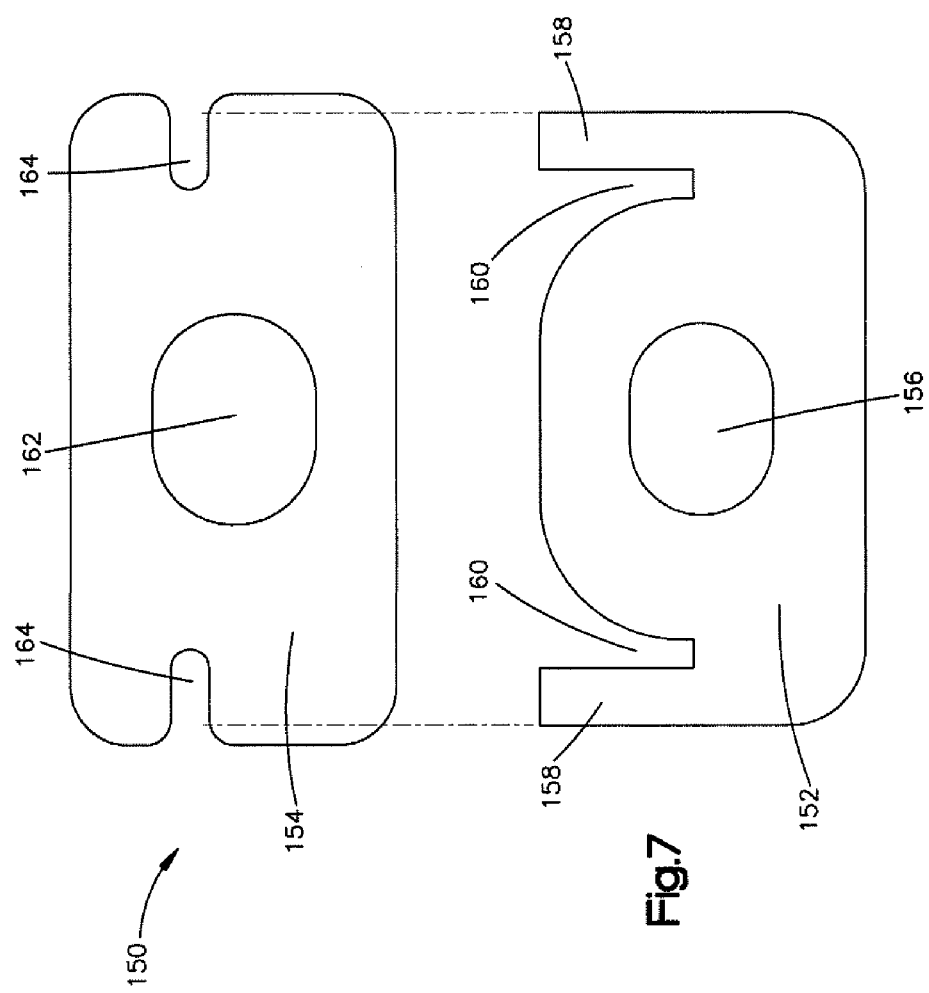

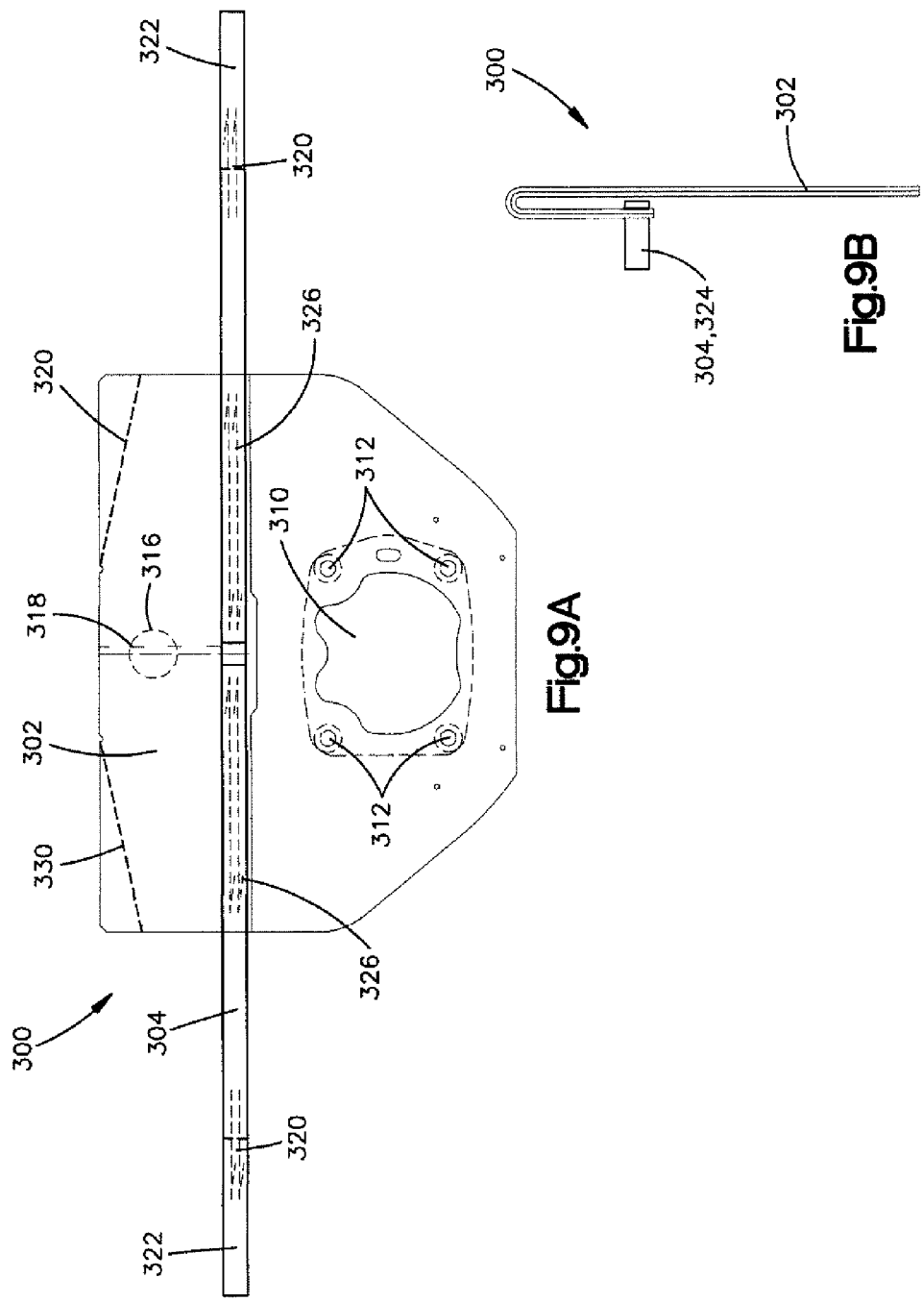

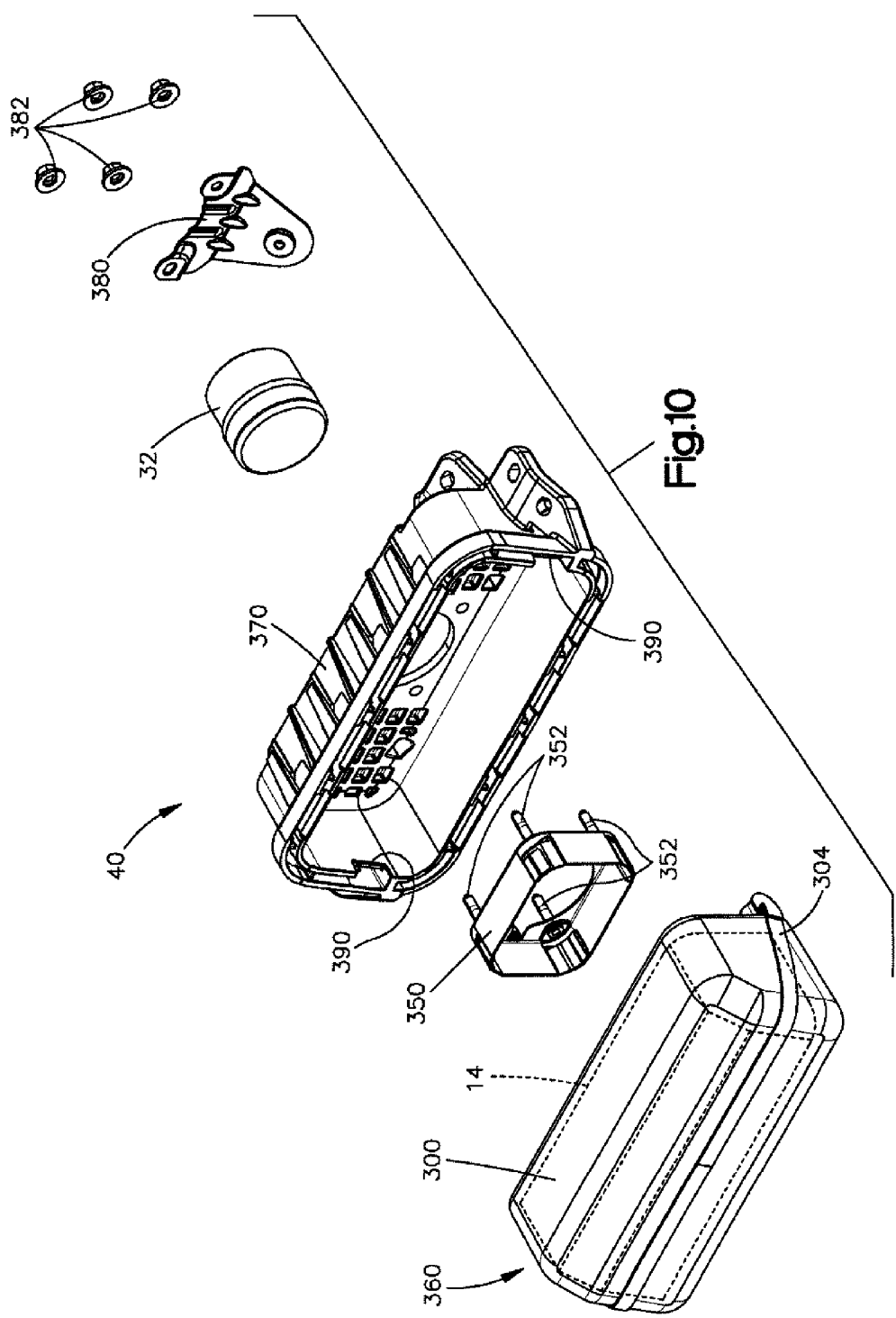

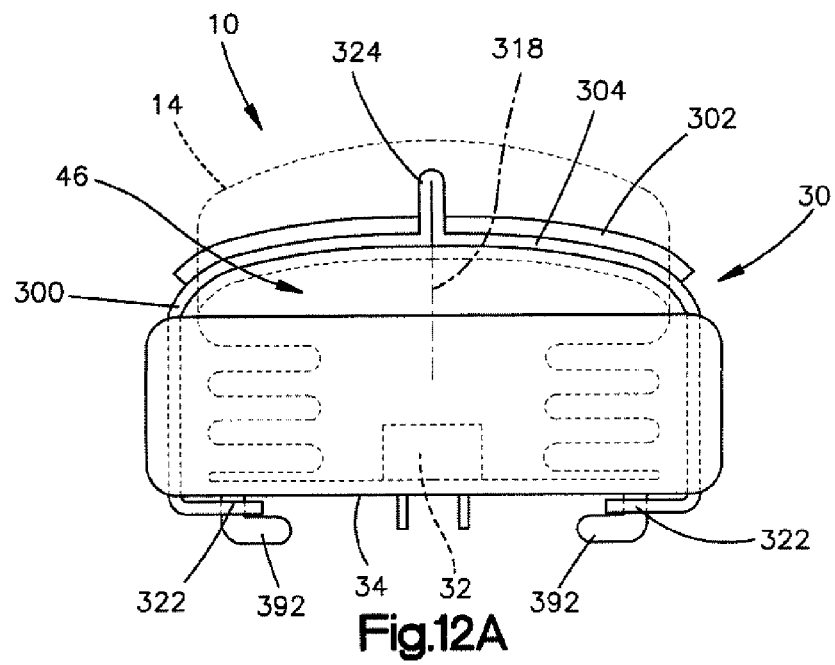
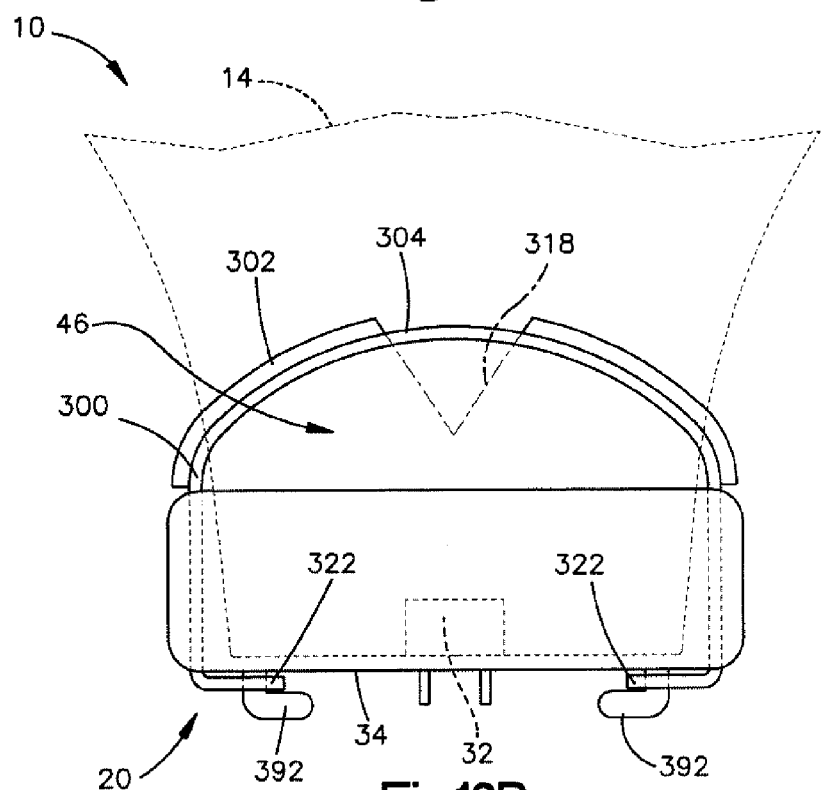

AIR BAG DEPLOYMENT RESTRICTOR

FIELD OF THE INVENTION

The present invention relates to an apparatus for helping to protect an occupant of a vehicle. More particularly, the present invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

SUMMARY OF THE INVENTION

The present invention relates to an apparatus for helping to protect an occupant of a vehicle that has an instrument panel and a windshield. The apparatus includes an air bag packaged in an air bag module. The air bag is inflatable to a deployed position between the instrument panel and a vehicle occupant. A deployment restrictor is secured to the air bag module. The deployment restrictor includes a deflector panel having a portion that is positioned between the packaged air bag and the windshield. The deflector panel at least partially covers the packaged air bag so that the deflector panel moves with the deploying air bag toward the windshield. The connection of the deployment restrictor to the air bag module limits movement of the deflector panel toward the windshield and thereby redirects the air bag to deploy away from where it would otherwise impact the windshield.

The present invention also relates to an apparatus for helping to protect an occupant of a vehicle that has an instrument panel and a windshield. The apparatus includes an air bag packaged in an air bag module. The air bag is inflatable to a deployed position between the instrument panel and a vehicle occupant. The apparatus also includes a deployment restrictor that includes a cowl-shaped fabric structure connected to the air bag module. The deployment restrictor directs the air bag to deploy through a deployment opening at least partially defined by the deployment restrictor in a direction away from where the air bag would otherwise deploy and impact the windshield.

The present invention also relates to an apparatus for helping to protect an occupant of a vehicle that has an instrument panel and a windshield. The apparatus includes an air bag inflatable to a deployed position between the instrument panel and a vehicle occupant. The apparatus also includes a deployment restrictor that includes a deflector panel having a portion that is positioned between the packaged air bag and the windshield and that at least partially covers the packaged air bag so that the deflector panel moves with the deploying air bag toward the windshield. The deployment restrictor has a cowl-shaped fabric structure that directs the air bag to deploy through a deployment opening at least partially defined by the deployment restrictor in a direction away from where the air bag would otherwise deploy and impact the windshield.

The present invention further relates to an apparatus for helping to protect an occupant of a vehicle that has an instrument panel and a windshield. The apparatus includes an air bag inflatable to a deployed position between the instrument panel and a vehicle occupant and a deployment restrictor. The deployment restrictor includes a deflector panel having a portion that is positioned between the packaged air bag and the windshield and that at least partially covers the packaged air bag so that the deflector panel moves with the deploying air bag toward the windshield. The deployment restrictor further includes a strap connected to the deflector panel. The deployment restrictor helps define a deployment opening through which the air bag deploys. The deployment restrictor is adapted to restrict initial air bag deployment to avoid windshield breakage, and the strap is adapted to lengthen after initial air bag deployment to increase the size of the deployment opening.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 5 is an exploded view illustrating components of the portion of the apparatus illustrated in FIG. 4.

FIGS. 6A-6F illustrate the assembly of the components of FIG. 5 to form the portion of the apparatus illustrated in FIG. 4.

FIG. 7 is a magnified view of a portion of the apparatus.

FIGS. 8A-8B and 9A-9B are plan views illustrating a portion of the apparatus at different stages of construction, according to an embodiment of the invention.

FIG. 10 is an exploded perspective view of the apparatus of FIGS. 8A-9B.

FIGS. 12A and 12B are schematic views illustrating the operation of the embodiment of FIGS. 8A-11.

DESCRIPTION

Figure 1:
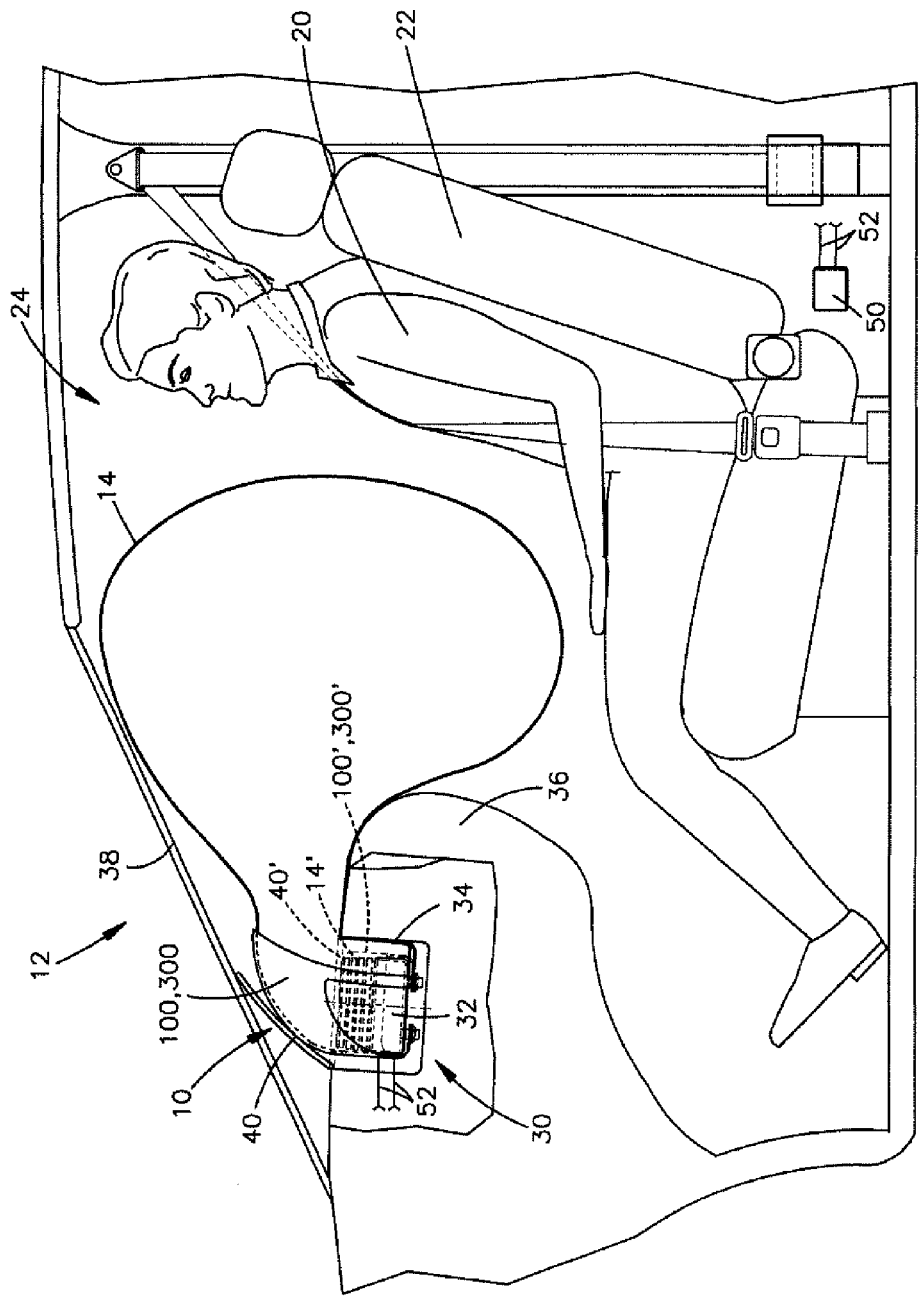
FIG. 1 is a schematic side view illustrating an apparatus for helping to protect an occupant of a vehicle.

An apparatus 10 for helping to protect an occupant 20 of a vehicle 12 includes an inflatable vehicle occupant protection device 14 in the form of an air bag. In the embodiment illustrated in FIG. 1, the air bag 14 is a passenger frontal air bag for helping to protect an occupant 20 of a seat 22 on a passenger side 24 of the vehicle 12.

The air bag 14 may be part of an air bag module 30 that includes an inflator 32 and a support or housing 34 for the air bag and inflator. The air bag 14 has a stored condition (shown in dashed lines at 14' in FIG. 1 and at 14 in FIG. 2) in which the air bag is folded and placed in the housing 34. The module 30 is mounted to a dash or instrument panel 36 of the vehicle 12 adjacent or near the intersection of the instrument panel and a windshield 38 of the vehicle. The housing 34 helps contain and support the air bag 14 and inflator 32 in the instrument panel 36. The air bag is inflatable from the stored condition to an inflated and deployed condition, which is illustrated at 14 in FIGS. 1 and 3.

An air bag door 40 is releasably connected to the instrument panel 36 and/or the housing 34. In a closed condition, the air bag door (shown in dashed lines at 40' in FIG. 1) forms a cover for the module 30 and helps enclose the air bag 14 in the stored condition in the housing 34. The air bag door is movable to an opened condition (shown in solid lines at 40 in FIG. 1) to uncover an opening 44 through which the air bag 14 may be deployed from the stored condition in the housing 34. The door 40 may be connected to the vehicle 12, e.g., the instrument panel 36, either directly or through the housing 34, by means (not shown), such as a plastic hinge portion, a strap, or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented, or hybrid. The apparatus 10 also includes a sensor/controller, illustrated schematically at 50, for sensing an event for which inflation of the air bag 14 is desired, such as a collision, and providing an actuation signal to the apparatus 10 in response to the sensed event. The inflator 32 is operatively connected to the sensor/controller 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition in a generally upward and rearward direction in the vehicle 12 to a deployed condition, such as the fully inflated and deployed condition illustrated in solid lines in FIG. 3. The air bag 14, while inflated, helps protect the vehicle occupant 20 from impacts with parts of the vehicle 12, such as the instrument panel 36.

The air bag 14 may have one or more actuatable features (not shown) for helping to control or tailor inflation of the air bag in response to vehicle conditions, occupant conditions, or both. These features may be actuatable actively, for example, in response to conditions determined via active sensors, or passively, for example, having a configuration responsive to physical conditions at the time of inflation and deployment. One example of an actuatable feature that the apparatus 10 may include is one or more adaptive tethers that can control or alter the shape or manner in which the air bag 14 is deployed. Another example of an actuatable feature that the apparatus 10 may include is one or more adaptive vents for venting inflation fluid from the air bag 14.

The position and orientation of the air bag module 30 in the instrument panel 36 can be limited or dictated by vehicle specific configurations/architecture. Because of this, it may not be possible to position and orient the air bag module 30 so that the air bag 14 deploys along a direct trajectory to the inflated and deployed condition. For example, in the configuration illustrated in FIG. 2, the air bag module 30 is positioned and oriented in a manner such that the air bag 14 would tend to deploy in a direction indicated generally by the arrow A that is generally vertically upward in the vehicle 12. As a result, the deploying air bag 14 may strike the windshield 38 as it inflates and deploys. This can be undesirable because the windshield 38 can act as a reaction surface against which the air bag 14 rests as it absorbs impacts from the occupant during use. It is therefore important that the windshield 38 remain as intact as possible, and not rupture or break during an impact event in which the air bag 14 deploys.

Figure 2:
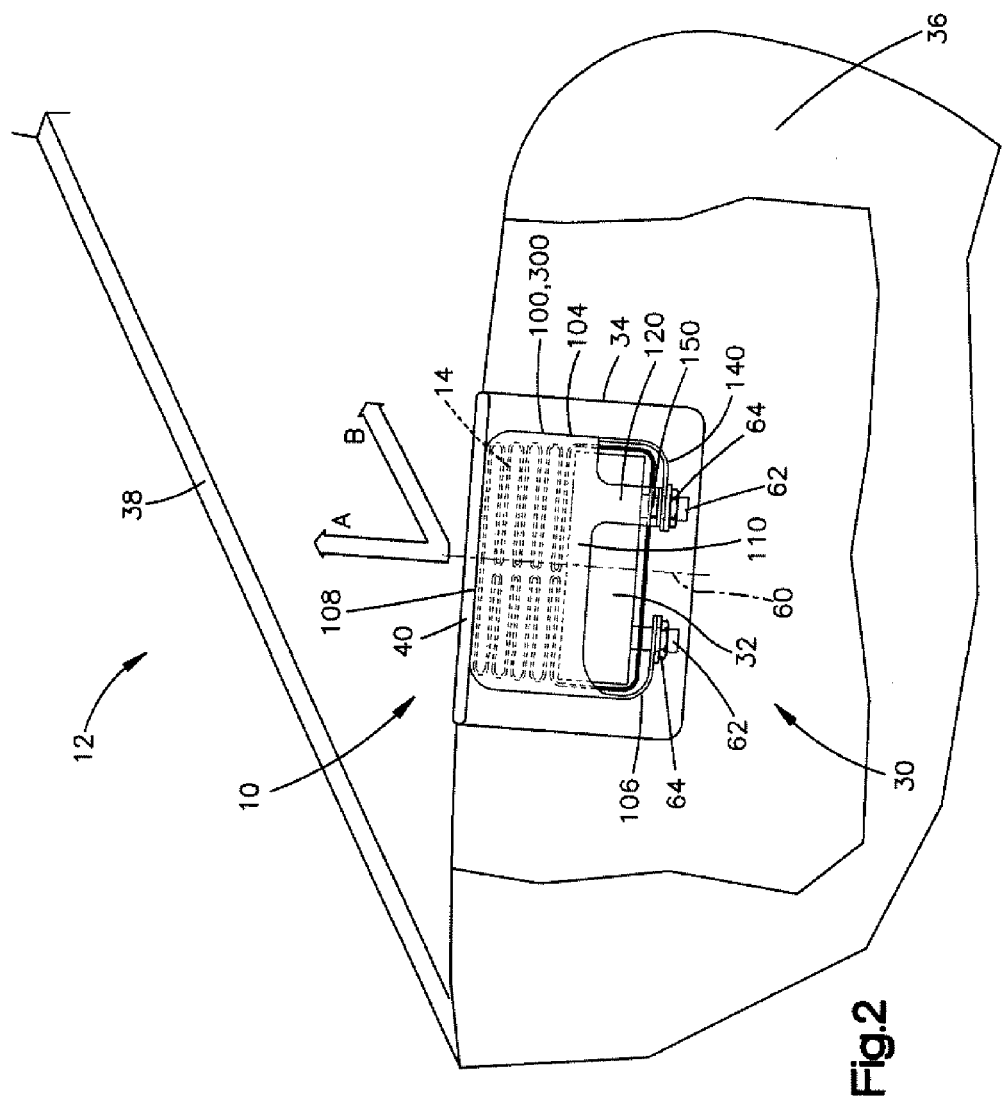
FIGS. 2 and 3 are schematic side views illustrating the apparatus of FIG. 1 in different conditions.
Figure 3:
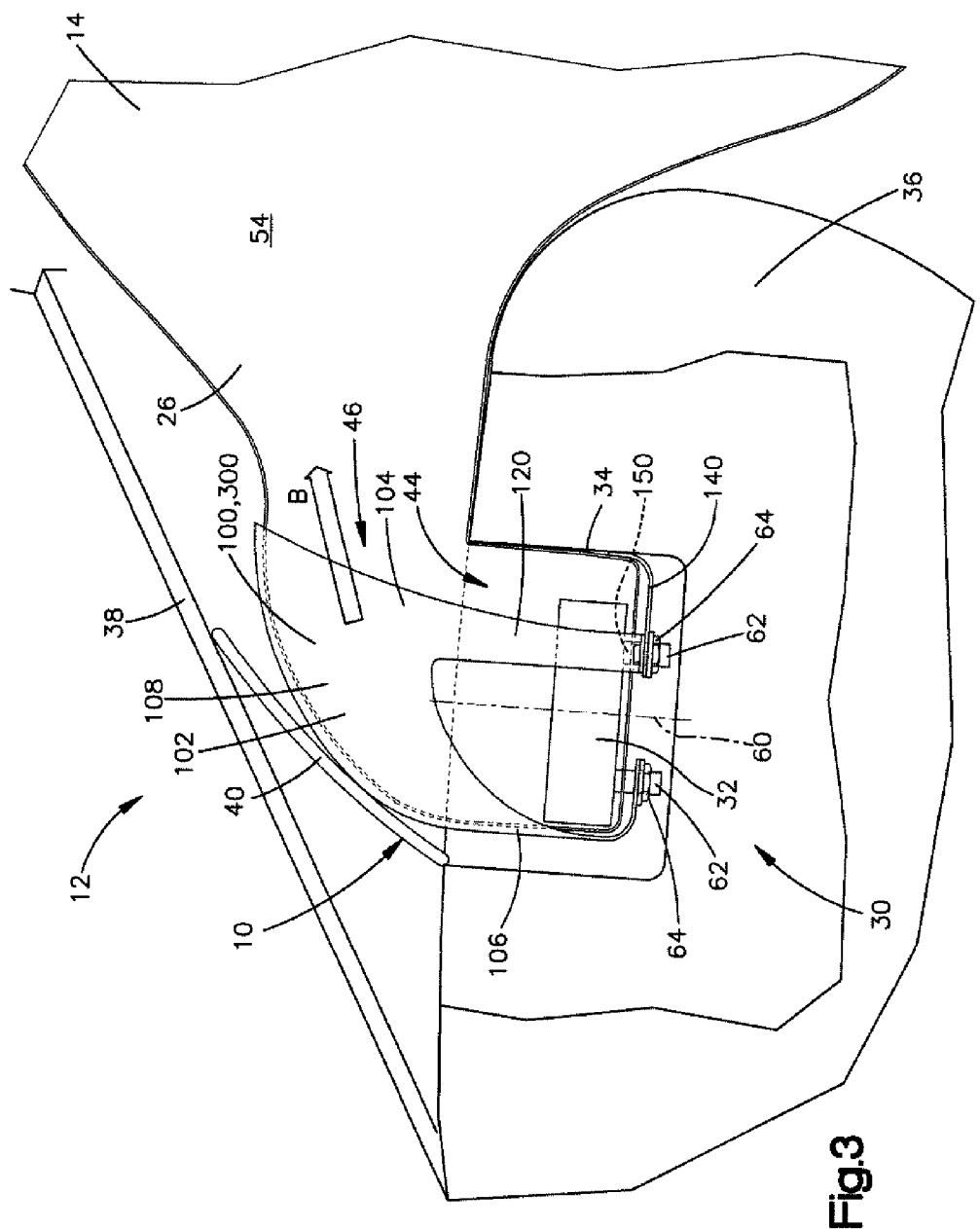

The apparatus 10 includes a deployment restrictor 100 that helps control deployment of the air bag 14. As shown in FIG. 2, the restrictor 100 can also serve as a protective cover for the air bag 14 when in the stored condition. As shown in FIG. 3, the restrictor 100 has a base that is anchored to the air bag module 30. In use, the restrictor 100 has a generally hood shaped or cowl shaped configuration that helps define a deployment opening 46. The deployment restrictor 100 guides/directs the inflating and deploying air bag 14 from the air bag module 30 through the deployment opening 46 in a manner so as to avoid the deployment door 40 impacting the windshield 38 with a magnitude sufficient to cause its breakage. The restrictor 100, directing the air bag 14 to deploy through the deployment opening 46, directs the air bag 14 to deploy away from the direction A and toward the direction indicated generally by the arrow B, which is both upward and rearward in the vehicle 12. By doing so, the restrictor 100 helps to prevent the initial force of the deploying air bag 14 from being absorbed by the windshield 38 through an impact with the deployment door 40.

The restrictor 100 does not necessarily prevent all contact between the air bag 14 and the windshield 38. To the contrary, the windshield 38 can necessarily support the air bag 14 against forces applied to the air bag 14 by an impacting and penetrating occupant. To provide the desired ride down effect, the air bag 14 requires a reaction surface to resist the tendency of the air bag to move with the impacting and penetrating occupant instead of absorbing the occupant forces and cushioning the occupant through a controlled deceleration/ride down. Without the windshield 38 acting as a reaction surface, the air bag 14 may not provide the desired ride down effect. In preventing the air bag 14 and deployment door 40 from damaging the windshield 38, the deployment restrictor 100 helps to ensure that the windshield can perform its function as a reaction surface for the air bag.

The deployment restrictor 100 can be constructed of any suitable material, such as nylon (e.g., woven nylon 6-6 yarns), and may be constructed in any suitable manner. For example, the restrictor 100 may include one or more pieces or panels of material. If more than one piece or panel is used, the pieces or panels may be interconnected by known means, such as stitching, ultrasonic welding, heat bonding, or adhesives, to form the restrictor. The deployment restrictor 100 may be coated, uncoated, or laminated. Those skilled in the art will appreciate that alternative materials, such as polyester yarn, and alternatives coatings, such as silicone, may also be used to construct the restrictor 100.

Figure 4:
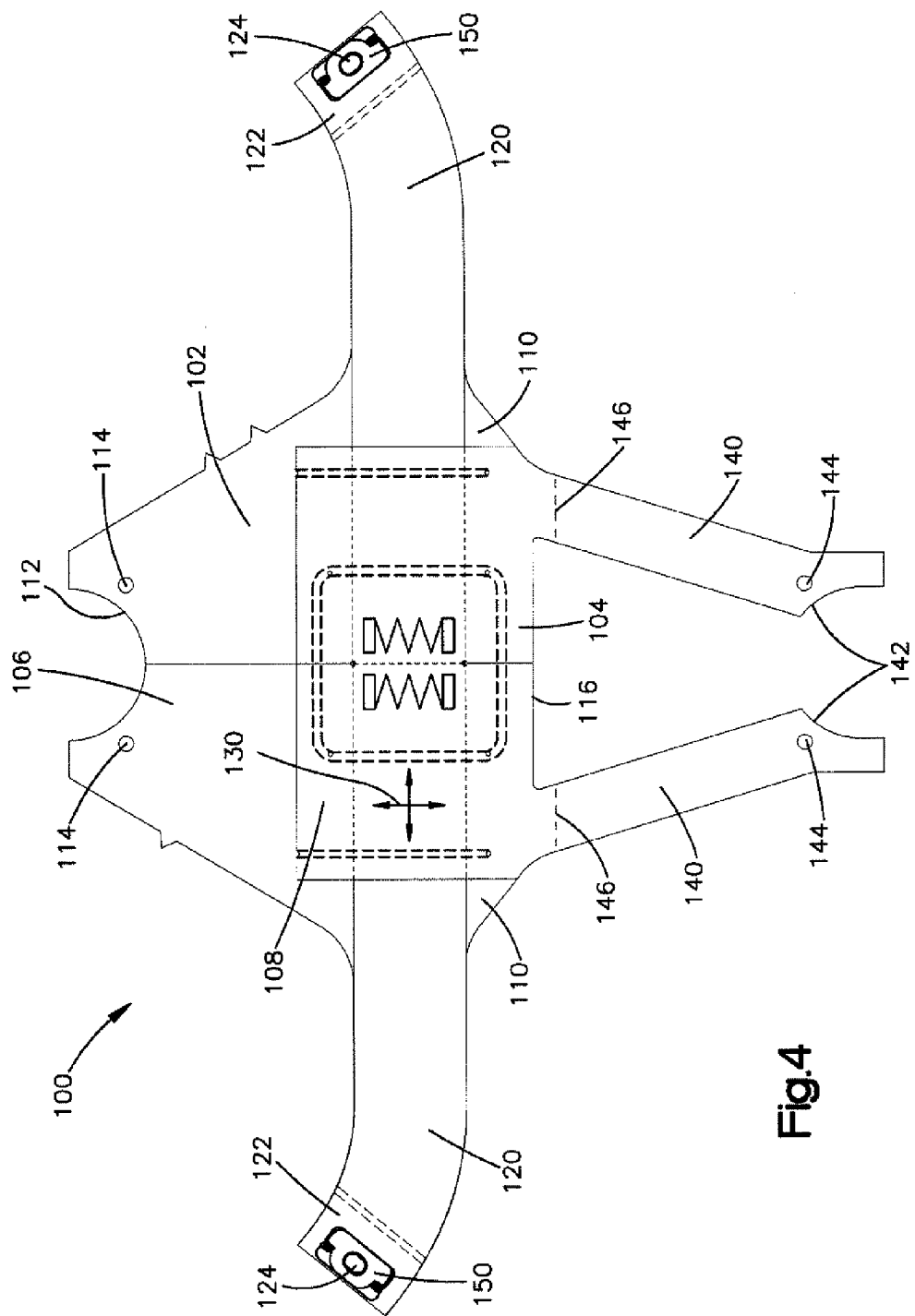
FIG. 4 is a schematic plan view of a portion of the apparatus, according to a first embodiment.

A first embodiment of the deployment restrictor 100 is illustrated in FIG. 4 (plan view) and FIG. 5 (exploded view). The deployment restrictor 100 includes a deflector panel 102 that is configured to assume the hood/cowl shape of the restrictor. The deflector panel 102 includes a rear portion 104 secured to the air bag module 30, a front portion 106 secured to the air bag module, and a central portion 108 that extends between the front and front portions. The deflector panel 102 also includes opposite side portions 110 that are connected to the air bag module 30. The deflector panel 102, primarily the central portion 108, covers and protects the air bag 14 in the deflated and stored condition of FIG. 2. When the air bag 14 inflates and deploys (FIG. 3), the deflector panel 102 moves with the deploying air bag, assumes its hood/cowl shaped configuration, and deflects the air bag away from the windshield 38, causing the air bag to deploy in the direction B.

The assembled deployment restrictor 100 is illustrated in detail in FIG. 4. Referring to FIG. 4, the deployment restrictor 100 includes deployment straps 120 for connecting the side portions 110 to the air bag module 30. The deployment straps 120 extend laterally from the central portion 108 at a position adjacent or near the rear portion 104. The deployment restrictor also includes release straps 140 for connecting the rear portion 104 to the air bag module 30. For facilitating the connection between the deployment straps 120 and the air bag module 30, the deployment restrictor 100 may be outfitted with reinforcing brackets 150.

The deployment restrictor 100 is configured with features that help to facilitate a mating connection with the air bag module 30. More particularly, these features are configured to facilitate a mating connection with the inflator 32. The inflator 32 can, for example, have a cylindrical configuration with a relatively short height as measured along its central axis 60. The inflator 32 includes studs 62 that can help secure the inflator, air bag 14, restrictor 100 and housing 34 to the vehicle 12. The connection between the inflator 32, air bag 14, and restrictor 100 facilitated by the studs 62 is illustrated schematically in the figures for the purpose of simplicity. This connection is completed with threaded fasteners 64, such as nuts.

As best shown in FIG. 4, the deflector panel 102 has a generally trapezoidal configuration, the rear portion 104 being wider than the front portion 106 with the central portion 108 tapering therebetween. The front portion 106 has a tapered configuration and includes a semi-circular cutout portion 112 formed along its terminal end. The cutout portion 112 mates with the round contour of the inflator 32 and fastening apertures 114 through which the studs can pass to connect the front portion to the air bag module 30.

The release straps 140 extend from the rear portion 104 and have terminal end portions that include circular cutout portions 142 for mating with the round contour of the inflator 32 and fastening apertures 144 through which the studs 62 can pass to connect the release straps and the rear portion to the air bag module 30. The release straps 140 also include rupturable portions 146 that are positioned adjacent a leading or front edge 116 of the deflector panel 102. The rupturable portions 146 may, for example, comprise perforations in the fabric material of the release straps 140 that weaken the release straps in that area.

The deployment straps 120 extend laterally from the deflector panel 102 and have a curved end portion 122 that includes an aperture 124 for securing the deployment straps to the air bag module 30. The curve of the end portion 122 positions the aperture 24 to receive the studs 62 and connect the deployment straps to the air bag module 30. The reinforcing brackets 150 bolster the strength and reliability of this connection of the deployment straps 120 to the air bag module 30.

According to the first embodiment, the deployment restrictor 100 is constructed to withstand the force of the inflating air bag 14 while directing the air bag to deploy in the desired direction. The deployment restrictor 100 also helps prevent the air bag door 40 from breaking the windshield 38. To achieve this high degree of strength, the deployment restrictor 100 has a multi-piece, modular configuration in which several components are assembled to provide the required strength in the areas of the restrictor. These components are illustrated in FIG. 5.

Referring to FIG. 5, the deployment restrictor 100 includes a first or left deflector panel piece 200 and a second or right deflector panel piece 202. The deflector panel pieces 200, 202 include respective deflector panel portions 204, 206 and deployment strap portions 208, 210. The deployment strap portions 208, 210 include respective reinforcing bracket apertures 212, 214. The deployment strap portions 204, 206 extend laterally away from their respective deflector panel pieces 200, 202 and include upwardly curved portions at or about the location of the reinforcing bracket apertures 212, 214. The deflector panel pieces 200, 202 also include their respective cutout portions 112 and fastening apertures 116.

The deployment restrictor 100 also includes a first or left deployment strap reinforcing piece 216 and a second or right deployment strap reinforcing piece 218. The deployment strap reinforcing pieces 216, 218 include respective reinforcing bracket apertures 220, 222. The deployment strap reinforcing pieces 216, 218 include upwardly curved portions at or about the location of the reinforcing bracket apertures 222, 224. The configurations of the deployment strap reinforcing pieces 216, 218 is similar or identical to the corresponding deployment strap portions 208, 210.

The deployment restrictor 100 also includes a release panel 230. The release panel 230 includes a deflector reinforcing portion 232 that has a generally rectangular configuration. The release panel 230 includes the release straps 140, which extend from a front edge of the deflector reinforcing portion 232. The release panel 230 therefore also includes the cutout portions 142 and fastening apertures 144 as portions of the release straps.

The deployment restrictor 100 also includes the reinforcing brackets 150, which are illustrated in greater detail in FIG. 7. The brackets 150 are constructed at least partially of a material, such as metal, that can be formed or bent as described herein to achieve the desired reinforcing performance. As shown in FIG. 7, each reinforcing bracket 150 includes a first bracket part 152 and a second bracket part 154, each of which have a generally rectangular overall configuration. The first bracket part 152 has a central aperture 156 and a pair of tabs 158 that are defined by slots 160 that cut into a longitudinal upper edge of the first bracket part 152, as viewed in FIG. 7. The second bracket part 154 has a central aperture 162 and a pair of slots 164 that cut into opposite edges spaced apart along the length of the second bracket part, as viewed in FIG. 7.

Figure 6B:
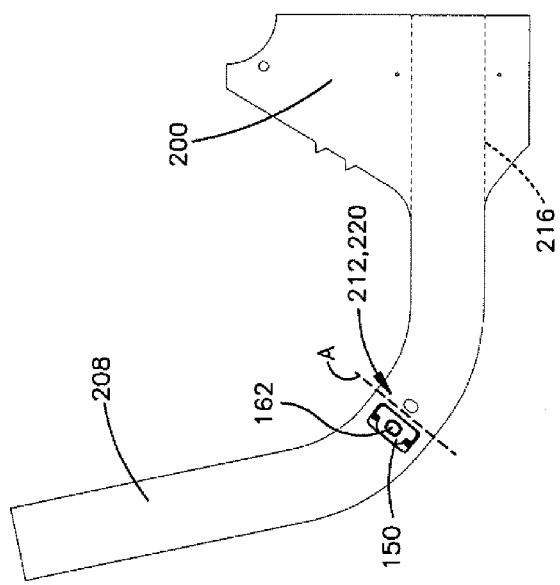

Assembly of the deployment restrictor 100 is illustrated in FIGS. 6A-6F. Referring to FIG. 6A, the components of the deployment restrictor 100 are assembled by initially positioning the left deployment strap reinforcing piece 216 overlying the deployment strap portion 208 of the left deflector panel piece 200. The right deployment strap reinforcing piece 218 is positioned overlying the deployment strap portion 210 of the right deflector panel piece 202. As shown in FIG. 6A, the deployment strap reinforcing pieces 216, 218 are configured to completely cover the deployment strap portions 208, 210 and to extend across the deflector panel portions 204, 206 to inside edges thereof. The components are positioned such that the reinforcing bracket apertures 220, 222 of the reinforcing pieces 216, 218 are aligned with the reinforcing bracket apertures 212, 214 of the deflector panel pieces 200, 202.

Figure 6C:
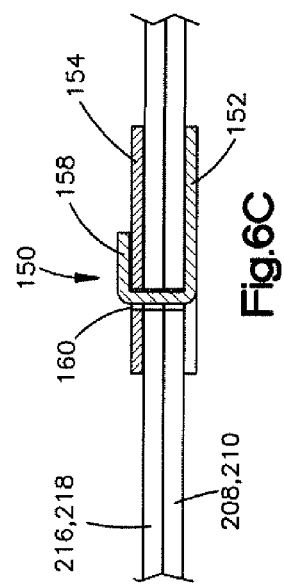

Referring to FIGS. 6B and 6C, the next step in assembling the deployment restrictor 100 is to assemble a reinforcing bracket 150 onto the left deflector panel piece 200 and its overlying reinforcing piece 216 and to assemble a reinforcing bracket 150 onto the right deflector panel piece 202 and its overlying reinforcing piece 218. To prepare the reinforcing brackets 150, the tabs 158 of the first bracket parts 152 are bent to extend transverse, e.g., to about 90 degrees, to the remainder of the first bracket part.

One of the first bracket parts 152 is then maneuvered from beneath the overlying components so that the tabs 158 extend through corresponding ones of the aligned reinforcing bracket apertures 212, 220 on the overlying left deployment strap reinforcing piece 216 and deployment strap portion 208. In doing so, the aperture 156 of the first bracket part 152 becomes aligned with the corresponding ones of the aligned reinforcing bracket apertures 212, 220 on the overlying left deployment strap reinforcing piece 216 and deployment strap portion 208. The second bracket part 154 is then positioned onto the overlying components such that the tabs 158 extend through the slots 164 and such that the aperture 162 overlies the corresponding ones of the apertures 212, 220 and the aperture 156. The tabs 158 are then bent over onto portions of the second bracket part 154 adjacent the slots 164 to thereby connect the bracket 150 to the assemblage.

The other of the first bracket parts 152 is then maneuvered from beneath the overlying components so that the tabs 158 extend through corresponding ones of the aligned reinforcing bracket apertures 214, 222 on the overlying right deployment strap reinforcing piece 218 and deployment strap portion 210. In doing so, the aperture 156 of the first bracket part 152 becomes aligned with the corresponding ones of the aligned reinforcing bracket apertures 214, 222 on the overlying right deployment strap reinforcing piece 218 and deployment strap portion 210. The second bracket part 154 is then positioned onto the overlying components such that the tabs 158 extend through the slots 164 and such that the aperture 162 overlies the corresponding ones of the apertures 214, 222 and the aperture 156. The tabs 158 are then bent over onto portions of the second bracket part 154 adjacent the slots 164 to thereby connect the bracket 150 to the assemblage.

Next, the assemblage of the deflector panel pieces 200, 202, the reinforcing pieces 216, 218, and the brackets 150 are flipped over, as shown in FIG. 5D. The overlying left deployment strap reinforcing piece 216 and deployment strap portion 208 are folded over along the dashed line A shown in FIG. 6B to the position shown in FIG. 5D. In doing so, the folded over strap reinforcing piece 216 and deployment strap portion 208 assume a four layer construction. Also, in doing so, the fastener receiving apertures 162, 212, and 220 are brought into alignment with each other. The components are maintained in this folded over condition by stitching 240, such as a double needle lock stitch.

Figure 6D:
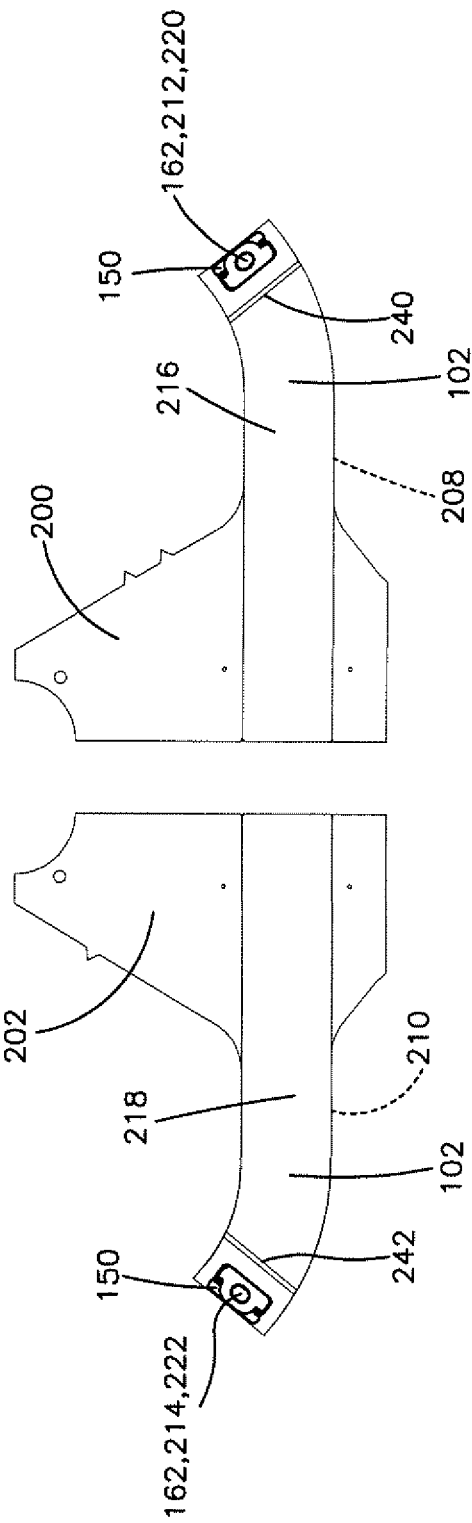

Next, the overlying left deployment strap reinforcing piece 218 and deployment strap portion 210 are folded over along the dashed line B shown in FIG. 6B to the position shown in FIG. 6D. In doing so, the folded over strap reinforcing piece 218 and deployment strap portion 210 assume a four layer construction. Also, in doing so, the fastener receiving apertures 162, 214, and 222 are brought into alignment with each other. The components are maintained in this folded over condition by stitching 242, such as a double needle lock stitch.

Next, the left and right deflector panel pieces 200 and 202 are aligned with abutting edges as shown in FIG. 6E. The release panel 230 is positioned with the reinforcing portion 232 overlying the deflector panel pieces 200, 202 and the attached deployment strap reinforcing pieces 216, 218, as shown in FIGS. 6E and 6F. The deflector panel pieces 200, 202, reinforcing pieces 216, 218, and release panel 230 are interconnected by stitching identified generally at 244 to interconnect those components and thereby form the assembled deployment restrictor 100. In one example the stitching 244 may comprise linear double needle stitching.

Next, as shown in FIGS. 6E and 6F, the assembled deployment restrictor 100 is positioned overlying the main panel 26 of the air bag 14. The deployment restrictor 100 is secured to the main panel 26 by stitching identified generally at 246 and 248 to interconnect the deployment restrictor and the air bag 14. The stitching 246, 248 extends through and interconnects the deflector panel pieces 200, 202, the reinforcing pieces 216, 218, the release panel 230, and the main panel 26 of the air bag 14. The stitching 246, 248 thus interconnects the multilayer portion of the deployment panel 102 of the to the main panel 26 of the air bag 14. In one example, the stitching 246 may comprise rectangular double needle stitching and the stitching 248 may comprise zigzag stitching.

To assemble the deployment restrictor 100 onto the air bag module 30, the central portion 108 of the deflector panel 102 is positioned over the folded air bag 14 as shown in FIG. 2. The apertures 114 of the front portion 106 are positioned over the corresponding studs 62 of the inflator 32. The apertures 144 of the release straps 120 are positioned over the corresponding studs 62 of the inflator. The aligned apertures of the deployment straps 120, i.e., the aligned apertures of the deployment strap reinforcing pieces 216, 218, the deployment strap portions 210, 212 of the deflector panel pieces 200, 202, and the reinforcing brackets 150, are positioned over the corresponding studs 62 of the inflator 32. The deployment restrictor 100 is secured onto the air bag module 30 via the fasteners 64.

The inflation and deployment of the air bag 14 can generate tremendous forces that the deployment restrictor 100 needs to withstand in order to function as intended to direct the inflating air bag away from impacting the windshield 38. Accordingly, the deployment restrictor 100 is configured to withstand these high forces. The components of the deployment restrictor 100, assembled as described herein, is reinforced in the areas where deployment forces are focused—along a band 250 (see FIGS. 6E and 6F) extending along the deployment straps 120 and across the deflector panel 102. Along this band 250, the deployment restrictor 100 has a construction that is at four layers thick along the deployment straps 120 and five layers thick in the area of the deflector panel 102. The band 250 essentially extends along the periphery of the deployment restrictor 100 that defines deployment opening 46, and therefore strengthens and reinforces the deployment restrictor in this important area. Additionally, the reinforcing brackets 150 help improve further the strength of the deployment straps 120 at the connection with the air bag module 30, where air bag deployment forces are concentrated.

Additionally, as shown in FIG. 5, the weave directions, i.e., warp and weft directions, of the fabric components are indicated by directional cross-arrows 130. The components of FIG. 5, when assembled as described herein to form the deployment restrictor 100 shown in FIG. 4, are arranged so that the weave directions of the components are maintained so that the warp and weft directions of the components extend parallel to each other when assembled. The weave directions 130 illustrated in FIG. 4 thus applies to all of the portions of the deployment restrictor 100 (I.a, the deflector panel 102, the deployment straps 120, and the release straps 140), as well as all of the individual components of the restrictor (i.e., the deflector panel pieces 200, 202, the deployment strap reinforcing pieces 216, 218, and the release panel 230). Thus, when deployment forces act along the length of the band 250, they are acting along, i.e., parallel to either the warp or weft direction in each layer of the band. Thus, the deployment forces act primarily in tension along the yarns of each layer in the band 250. This minimizes the amount of shear acting on the band 250 and thus helps to further prevent rupture.

According to a second embodiment, the deployment restrictor 300 is constructed to withstand the force of the inflating air bag 14 while directing the air bag to deploy in the desired direction. The deployment restrictor 300 also helps prevent the air bag door 40 from breaking the windshield 38. To achieve this high degree of strength, the deployment restrictor 300 has a configuration in which components are assembled to provide the required strength in the areas of the restrictor. These components are illustrated in FIGS. 8A-8B.

Figure 8A:
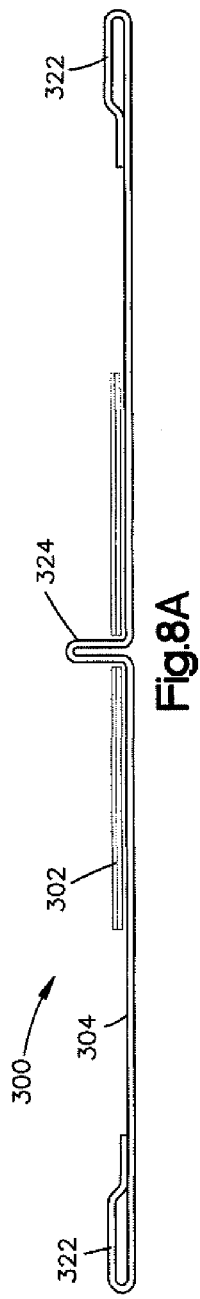
Figure 8B:
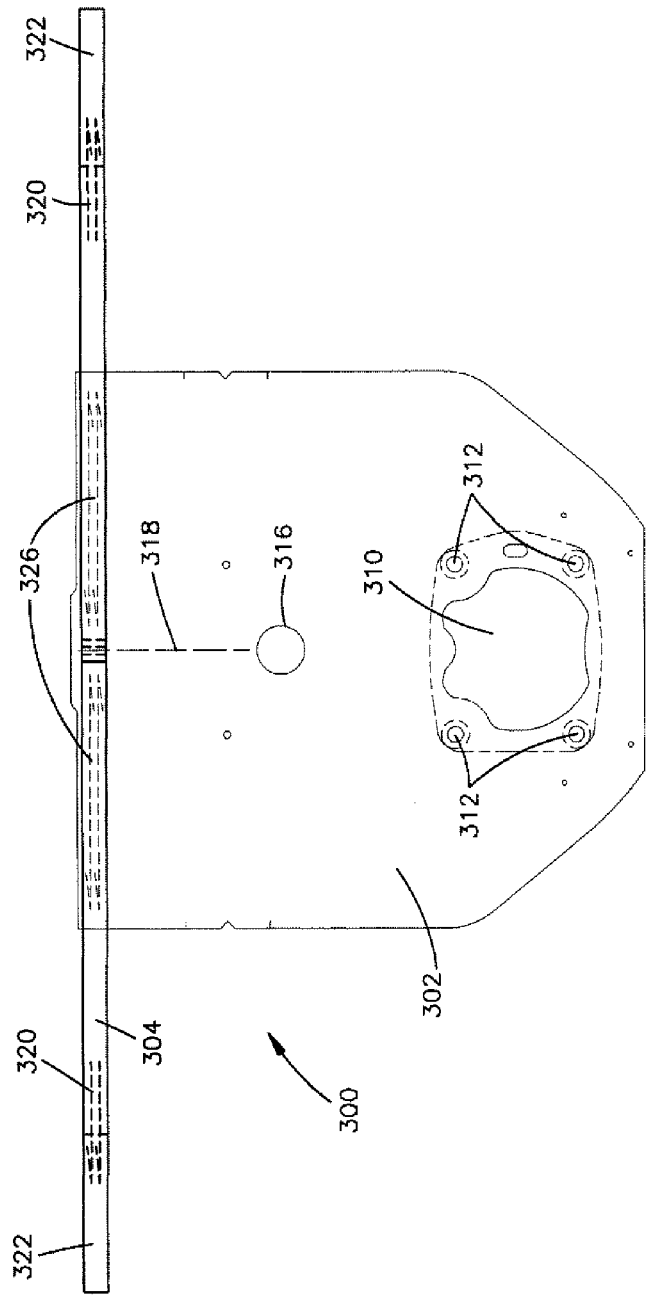
Figure 11:
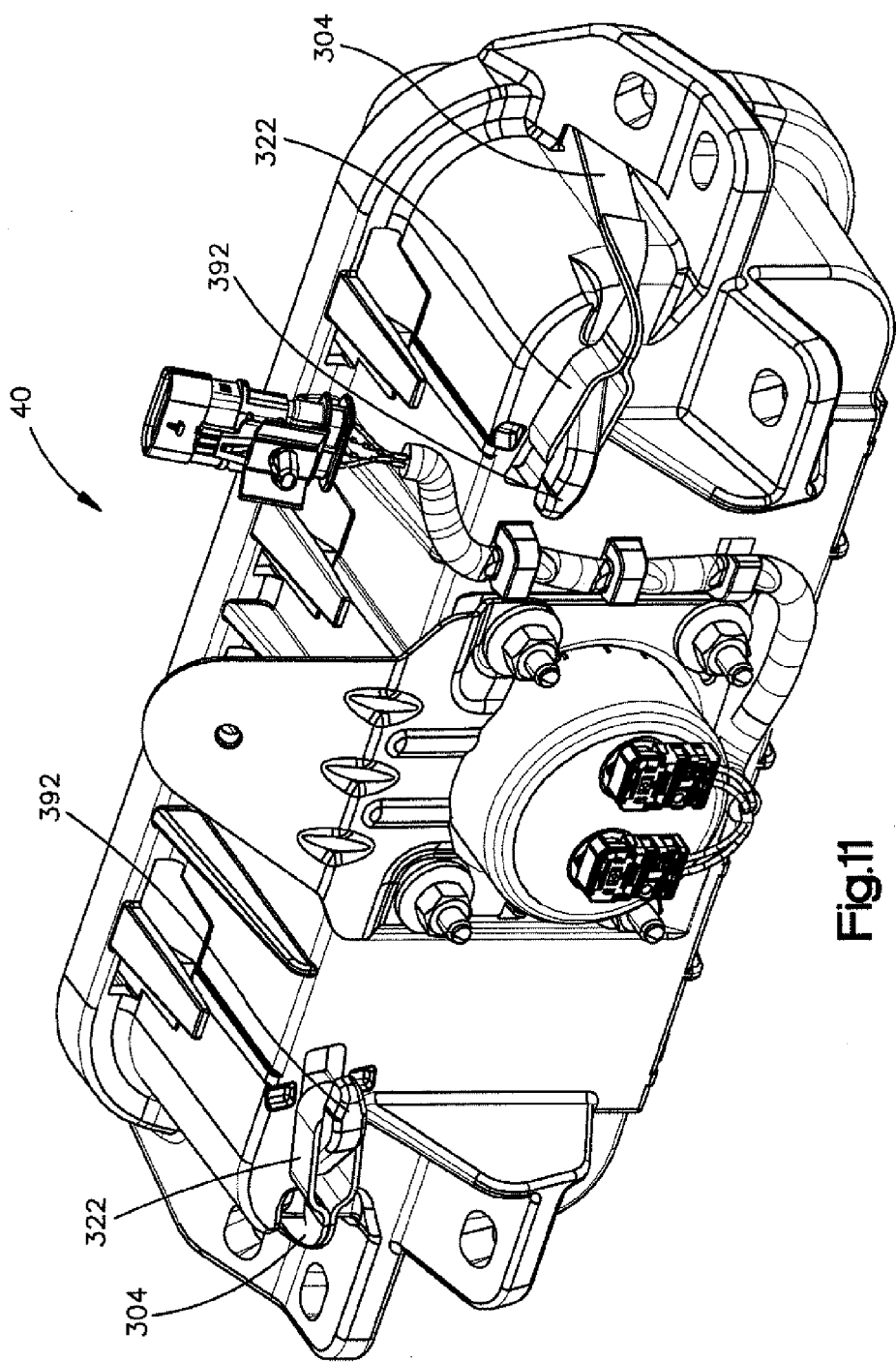
FIG. 11 is a perspective view of the apparatus of FIG. 10 in an assembled condition.

Referring to FIGS. 8A and 8B, the deployment restrictor 300 includes a deflector panel 302 and a deployment strap 304. The deflector panel 300 has a generally rectangular/trapezoidal configuration and includes an inflator receiving portion 310. The inflator receiving portion 310 is shaped and configured to have a portion 312 for receiving the inflator, and a portion 314 for receiving fasteners that are used to assemble the air bag module. As shown in FIG. 8A, the deflector panel 302 may be constructed of two identically configured layers that are interconnected, e.g., by stitching, to give the panel a two-ply construction. The deflector panel 302 also includes a central opening 316 and a tear seam 318 that extends from the opening to an upper edge of the panel.

The deployment strap 304 has opposite ends that are folded over and connected by means 320, such as stitching, to form loops 322 at opposite ends of the strap. A central portion of the deployment strap 304 is pushed through the tear seam 318 adjacent the upper edge to form a slackened portion in the form of a loop 324 of strap material on a rear side of the deflector panel 302. The deployment strap 304 is secured to the deflector panel 302 by connections 326, such as stitching, on opposite sides of the tear seam 318. The connections 326 maintain the loop 324 in the strap 304.

Referring to FIGS. 9A and 9B, the deflector panel 302 is folded over onto itself, which locates the deployment strap 304 more centrally on the panel, i.e., near the inflator receiving portion 310. The folded over portions of the deflector panel 302 are interconnected by means 330, such as stitching, to help maintain the panel in the folded-over condition.

Referring to the exploded view of FIG. 10, to assemble the air bag module 40 with the deployment restrictor 300, the restrictor is initially positioned with studs 352 of the air bag retainer 350 extending through the apertures 312 (see FIGS. 8A and 9A) in the restrictor and through apertures (not shown) in the air bag 14. The air bag 14 is then folded and the deployment restrictor 300 is then wrapped around the folded air bag to form a package 360 with the strap 304 extending from opposite sides thereof. The package 360 along with the retainer 350 are positioned in an air bag housing 370 along with the inflator 32 so that the studs 352 protrude through corresponding openings in the housing. A mounting bracket 380 is positioned over a protruding pair of the studs 352 and the assemblage is fastened together with threaded fasteners, such as nuts 382. The loops 322 at the opposite ends of the strap 304 are slid through slits 390 in the housing 370 and slid over corresponding hooks 392 to connect the strap to the housing.

The deployment restrictor 300 is configured to withstand the high forces generated by the inflating air bag 14. Along the strap 304, the deployment restrictor 300 has a construction that is three layers thick along, including the thickness of the strap and the two-ply deflector panel 302. Thus, when the air bag 14 deploys, the deployment restrictor 300 helps restrict the deployment door 40 from impacting and breaking the windshield 38.

Referring to FIGS. 12A and 12B the restrictor 300 is configured to restrict initial deployment of the air bag 14. This helps prevent rapid acceleration of the deployment door 40 (see FIG. 1) during initial air bag deployment so as to avoid damaging the windshield 38. Referring to FIG. 12A, the tear stitching 318 is maintained intact during the initial phases of air bag deployment. This maintains the loop 324 in the strap 304, thus giving the strap a shortened configuration during the initial stages of air bag deployment. Since the length of the strap 304 helps determine the size of the deployment opening 46, the size of the opening is restricted during these initial stages of deployment.

As the air bag 14 continues to inflate and deploy, the tear stitching 318 eventually breaks, as shown in FIG. 12B. As a result, the loop 324 is released and the strap 304 extends, taking up the slack of the loop and thus giving the strap a lengthened configuration throughout the remainder of air bag 14 deployment. This increase in strap 304 length increases the size of the deployment opening 46, thus reducing the restrictive effects of the restrictor 300 and permitting the air bag 14 to inflate and deploy. The restrictor 300 thus allows the air bag 14 to deploy more rapidly after the risk of windshield breakage is eliminated. The restrictor 300 thus initially restricts air bag 14 deployment to avoid rupturing the windshield 38 by the deployment door 40, and then expands to lessen or remove the restriction on the air bag deployment further inflation and deployment.

From the above description of the invention, those skilled in the art will perceive improvements, changes and modifications. For example, certain ones of the components that are assembled to form the deployment restrictor 100 (see FIG. 5) may be combined to form a single component. For instance, the deflector panel pieces 200, 202 could be combined as a single component, or the deployment strap reinforcing pieces 216, 218 could be combined as a single component. These and other such improvements, changes and modifications within the skill of the art are intended to be covered by the appended claims.

Having described the invention, the following is claimed:

1. An apparatus for helping to protect an occupant of a vehicle that has an instrument panel and a windshield, the apparatus comprising:

an air bag packaged in an air bag module, the air bag being inflatable to a deployed position between the instrument panel and a vehicle occupant; and a deployment restrictor secured to the air bag module, the deployment restrictor comprising a deflector panel having a portion that is positioned between the packaged air bag and the windshield and that at least partially covers the packaged air bag so that the deflector panel moves with the deploying air bag toward the windshield, the connection of the deployment restrictor to the air bag module limiting movement of the deflector panel toward the windshield and thereby redirecting the air bag to deploy away from where it would otherwise impact the windshield;

wherein the deflector panel comprises a front portion secured to the air bag module, and side portions connected to the air bag module laterally of the packaged air bag, the connections of the front portion and side portions to the air bag module limiting movement of the deflector panel so that the deflector panel directs the air bag to deploy away from where it would otherwise impact the windshield; and wherein the deployment restrictor comprises a multilayer strap that extends between the connections of the side portions to the air bag module, the multilayer strap being positioned to receive the initial force generated by the deploying air bag.

2. The apparatus recited in claim 1, wherein the deployment restrictor at least partially defines a deployment opening through which the air bag deploys, the portions of the deployment restrictor that define the deployment opening helping to direct the air bag to deploy through the deployment opening.

3. The apparatus recited in claim 1, wherein the multilayer strap at least partially defines a deployment opening through which the air bag deploys, the strap helping to direct the air bag to deploy through the deployment opening.

4. The apparatus recited in claim 1, further comprising brackets that are fastened to the multilayer straps, the brackets reinforcing the connection of the straps to the air bag module.

5. The apparatus recited in claim 1, wherein the multilayer strap comprises deployment straps that connect the side portions of the deflector panel to the air bag module.

6. The apparatus recited in claim 5, wherein the deployment straps comprise narrow strip portions of the deflector panel that extend from the side portions, the strips being doubled over onto themselves to give the deployment straps the multilayer construction.

7. The apparatus recited in claim 6, wherein the deployment restrictor further comprises deployment strap reinforcing portions comprising narrow strips of material positioned overlying the narrow strip portions of the deflector panel, the deployment strap reinforcing portions being doubled over along with the narrow strip portions of the deflector panel and thereby forming additional layers in the multilayer construction of the deployment straps.

8. The apparatus recited in claim 1, wherein the deployment restrictor comprises a cowl-shaped fabric structure connected to the air bag module, the deployment restrictor at least partially defining a deployment opening through which the air bag deploys.

9. An apparatus for helping to protect an occupant of a vehicle that has an instrument panel and a windshield, the apparatus comprising:

an air bag packaged in an air bag module, the air bag being inflatable to a deployed position between the instrument panel and a vehicle occupant; and a deployment restrictor secured to the air bag module, the deployment restrictor comprising a deflector panel having a portion that is positioned between the packaged air bag and the windshield and that at least partially covers the packaged air bag so that the deflector panel moves with the deploying air bag toward the windshield, the connection of the deployment restrictor to the air bag module limiting movement of the deflector panel toward the windshield and thereby redirecting the air bag to deploy away from where it would otherwise impact the windshield;

wherein the deflector panel comprises a front portion secured to the air bag module, and side portions connected to the air bag module laterally of the packaged air bag, the connections of the front portion and side portions to the air bag module limiting movement of the deflector panel so that the deflector panel directs the air bag to deploy away from where it would otherwise impact the windshield;

wherein the deployment restrictor at least partially defines a deployment opening through which the air bag deploys, the portions of the deployment restrictor that define the deployment opening helping to direct the air bag to deploy through the deployment opening; and wherein the deflector panel further comprises a rear portion secured to the air bag module, the deployment restrictor comprising a rupturable portion for releasing the connection of the rear portion to the air bag module in response to deployment of the air bag to permit the air bag to deploy through the deployment opening.

10. An apparatus for helping to protect an occupant of a vehicle that has an instrument panel and a windshield, the apparatus comprising:

an air bag packaged in an air bag module, the air bag being inflatable to a deployed position between the instrument panel and a vehicle occupant; and a deployment restrictor secured to the air bag module, the deployment restrictor comprising a deflector panel having a portion that is positioned between the packaged air bag and the windshield and that at least partially covers the packaged air bag so that the deflector panel moves with the deploying air bag toward the windshield, the connection of the deployment restrictor to the air bag module limiting movement of the deflector panel toward the windshield and thereby redirecting the air bag to deploy away from where it would otherwise impact the windshield, wherein the deployment restrictor comprises at least one strap having looped ends for being secured to integral hooks formed on the air bag module.

11. An apparatus for helping to protect an occupant of a vehicle that has an instrument panel and a windshield, the apparatus comprising:

an air bag packaged in an air bag module, the air bag being inflatable to a deployed position between the instrument panel and a vehicle occupant; and a deployment restrictor secured to the air bag module, the deployment restrictor comprising a deflector panel having a portion that is positioned between the packaged air bag and the windshield and that at least partially covers the packaged air bag so that the deflector panel moves with the deploying air bag toward the windshield, the connection of the deployment restrictor to the air bag module limiting movement of the deflector panel toward the windshield and thereby redirecting the air bag to deploy away from where it would otherwise impact the windshield, wherein the deflector panel comprises a tear seam, the deployment restrictor comprising a strap and connections connecting the strap to the deflector panel on opposite sides of the tear seam, the tear seam maintaining a portion of the strap between the connections in a slackened condition.

12. The apparatus recited in claim 11, wherein the strap helps define a deployment opening through which the air bag deploys, the tear seam being adapted to rupture as the air bag deploys which takes up the slackened portion of the strap to increase the size of the deployment opening.

13. An apparatus for helping to protect an occupant of a vehicle that has an instrument panel and a windshield, the apparatus comprising:
an air bag packaged in an air bag module, the air bag being inflatable to a deployed position between the instrument panel and a vehicle occupant; and
a deployment restrictor comprising a cowl-shaped fabric structure connected to the air bag module, the deployment restrictor directing the air bag to deploy through a deployment opening at least partially defined by the deployment restrictor in a direction away from where the air bag would otherwise deploy and impact the windshield, wherein the deployment restrictor comprises a multilayer reinforced strap that extends along the portion of the deployment opening defined by the deployment restrictor.

14. The apparatus recited in claim 13, wherein the deployment restrictor comprises a deflector panel having a cowl-shaped portion that at least partially covers the air bag in the packaged, pre-deployment condition, movement of the cowl-shaped portion with the air bag upon deployment being limited by the connection of the deployment restrictor to the air bag module so that the deflector panel redirects the deploying air bag.

15. The apparatus recited in claim 14, wherein the deflector panel comprises a front portion and opposite side portions that are secured to the air bag module, the connections of the front portion and side portions to the air bag module helping to maintain the cowl-shaped configuration of the deflector panel so that the deflector panel redirects the deploying air bag.

16. The apparatus recited in claim 13, wherein the reinforced strap is configured to receive and withstand the initial force generated by the deploying air bag.

17. The apparatus recited in claim 13, further comprising brackets that are fastened to opposite ends of the reinforced strap to help reinforce the connection of the strap to the air bag module.

18. An apparatus for helping to protect an occupant of a vehicle that has an instrument panel and a windshield, the apparatus comprising:
an air bag packaged in an air bag module, the air bag being inflatable to a deployed position between the instrument panel and a vehicle occupant; and
a deployment restrictor comprising a cowl-shaped fabric structure connected to the air bag module, the deployment restrictor directing the air bag to deploy through a deployment opening at least partially defined by the deployment restrictor in a direction away from where the air bag would otherwise deploy and impact the windshield, wherein the deployment restrictor comprises a deflector panel having a cowl-shaped portion that at least partially covers the air bag in the packaged, pre-deployment condition, movement of the cowl-shaped portion with the air bag upon deployment being limited by the connection of the deployment restrictor to the air bag module so that the deflector panel redirects the deploying air bag;
wherein the deflector panel comprises a front portion and opposite side portions that are secured to the air bag module, the connections of the front portion and side portions to the air bag module helping to maintain the cowl-shaped configuration of the deflector panel so that the deflector panel redirects the deploying air bag; and
wherein the deflector panel further comprises a rear portion secured to the air bag module through a rupturable connection that is releasable to permit the deployment restrictor to assume its cowl-shaped configuration and help define the deployment opening through which the air bag is deployed.

19. An apparatus for helping to protect an occupant of a vehicle that has an instrument panel and a windshield, the apparatus comprising:
an air bag packaged in an air bag module, the air bag being inflatable to a deployed position between the instrument panel and a vehicle occupant; and
a deployment restrictor comprising a cowl-shaped fabric structure connected to the air bag module, the deployment restrictor directing the air bag to deploy through a deployment opening at least partially defined by the deployment restrictor in a direction away from where the air bag would otherwise deploy and impact the windshield, wherein the deployment restrictor comprises one or more straps having looped ends for being secured to integral hooks formed on the air bag module.

20. An apparatus for helping to protect an occupant of a vehicle that has an instrument panel and a windshield, the apparatus comprising:
an air bag packaged in an air bag module, the air bag being inflatable to a deployed position between the instrument panel and a vehicle occupant; and
a deployment restrictor comprising a cowl-shaped fabric structure connected to the air bag module, the deployment restrictor directing the air bag to deploy through a deployment opening at least partially defined by the deployment restrictor in a direction away from where the air bag would otherwise deploy and impact the windshield, wherein the fabric structure comprises a tear seam, the deployment restrictor comprising a strap and connections connecting the strap to the fabric structure on opposite sides of the tear seam, the tear seam maintaining a portion of the strap between the connections in a slackened condition.

21. The apparatus recited in claim 20, wherein the strap helps define the deployment opening, the tear seam being adapted to rupture after initial air bag deployment so that the slackened portion of the strap is taken up to increase the size of the deployment opening.

22. An apparatus for helping to protect an occupant of a vehicle that has an instrument panel and a windshield, the apparatus comprising:
an air bag inflatable to a deployed position between the instrument panel and a vehicle occupant; and
a deployment restrictor comprising a deflector panel having a portion that is positioned between the packaged air bag and the windshield and that at least partially covers the packaged air bag so that the deflector panel moves with the deploying air bag toward the windshield, the deployment restrictor comprising a cowl-shaped fabric structure that directs the air bag to deploy through a deployment opening at least partially defined by the deployment restrictor in a direction away from where the air bag would otherwise deploy and impact the windshield, wherein the deployment restrictor comprises a multilayer reinforced strap that extends along the portion of the deployment opening defined by the deployment restrictor.

23. An apparatus for helping to protect an occupant of a vehicle that has an instrument panel and a windshield, the apparatus comprising:
- an air bag inflatable to a deployed position between the instrument panel and a vehicle occupant; and
- a deployment restrictor comprising a deflector panel having a portion that is positioned between the packaged air bag and the windshield and that at least partially covers the packaged air bag so that the deflector panel moves with the deploying air bag toward the windshield, the deployment restrictor further comprising a strap connected to the deflector panel, the deployment restrictor helping to define a deployment opening through which the air bag deploys, the deployment restrictor being adapted to restrict initial air bag deployment to avoid windshield breakage, the strap being adapted to lengthen after initial air bag deployment to increase the size of the deployment opening.

24. The apparatus recited in claim 23, wherein the deployment restrictor comprises tear seam in the deflector panel that maintains a portion of the strap in a slackened condition during initial air bag deployment, the tear seam being adapted to rupture after initial deployment, the slackened portion of the strap being taken up in response to tear seam rupture.

25. The apparatus recited in claim 24, wherein the deployment restrictor further comprises connections connecting the strap to the deflector panel on opposite sides of the tear seam, the slackened portion of the strap being located between the connections.

* * * * *